United States Patent [19]

Johnson

[11] 4,438,670

[45] Mar. 27, 1984

[54] HIGH SPEED WELDER WITH MAGNETIC ALIGNMENT OF WELDING SLUG AFTER CUTTING

[75] Inventor: Martin D. Johnson, Hadley, Pa.

[73] Assignee: Electronic Equipment Development Ltd., Toluca Lake, Calif.

[21] Appl. No.: 381,178

[22] Filed: May 24, 1982

[51] Int. Cl.³ .......................... B26D 3/16; B23D 21/00
[52] U.S. Cl. .......................................... 83/154; 83/78;
83/108; 83/199; 83/694
[58] Field of Search .................. 83/23, 108, 199, 196,
83/200, 153, 154, 25, 694, 78; 29/33 F;
140/139, 140

[56] References Cited

U.S. PATENT DOCUMENTS 3,165,207  1/1965  Campbell ............................. 83/154
3,244,040  4/1966  Schmitz ................................. 83/23

Primary Examiner—James M. Meister
Attorney, Agent, or Firm—Webb, Burden, Robinson & Webb

[57] ABSTRACT

In a method and apparatus for cutting and welding slugs to lead wires, a die has a bore therein through which the slug feedstock is stepwise advanced. The die is ferromagnetic and a permanent magnet is positioned with one magnetic pole adjacent the cutting end of the die. A knife has an opening therein for receiving the feedstock advancing out of the die when the hole and die are aligned. Rocking of the knife cuts free a slug. When the knife is rocked back into alignment, the slug positions itself on the freshly cut end of the feedstock. Advance of the feedstock then pushes the slug out of the knife and presents it to a clamp.

1 Claim, 4 Drawing Figures

HIGH SPEED WELDER WITH MAGNETIC ALIGNMENT OF WELDING SLUG AFTER CUTTING

DESCRIPTION

1. Technical Field

This invention relates to an improvement in the method and apparatus for welding a slug to the lead wire in the production of capacitors and the like electronic elements. More particularly, this invention pertains to a slug cutter having a unique magnetic alignment of the cut slug for presentation to a slug clamp which carries the slug to the welding position.

2. Background Art

In the manufacture of capacitors, lead wires, for example, wires 0.02 inch in diameter and up to about 2 inches long are welded to a slug which may be cylindrical having a diameter of, say 0.03 inch and an axial length of about 0.07 inch. The lead wires are continuously cut from a long wire delivered from a reel. The slugs may either be preformed or may be cut from a long feedstock delivered from another reel. This invention pertains to an improvement in the apparatus for cutting the slugs from a long feedstock and clamping the slugs for presentation to the lead wire at the welding location. Applicant's invention has particular application to the welding of copper coated iron slugs (Dumet slugs).

Prior art welding of leads to slugs has typically been limited to speeds of about 100 parts per minute with recent advances enabling 300 parts per minute. The slug cutter according to this invention permits the cutting and clamping of slugs at the rate of as high as 750 parts per minute.

It would be a simple matter to deliver feedstock to a cutter and continuously cut slugs therefrom allowing the slugs to fall free into a bowl or the like. Systems also exist for feeding slugs from a bowl to a clamp for welding to a lead wire. However, the slugs would then be bumped and scraped against each other and the sides and bottom of the bowl. This has the undesirable effect of breaking free a borate coating on the uncut surfaces of the slugs. The coating is necessary for providing a glass to metalseal at a later step in the production of diodes.

Due to the short length of the slug, it is not practical to grip the end of the slug wire during cutting. Thus, immediately after the slug is cut free from the feedstock it is not positively held in any position. Hence, the slug must be captured immediately after cutting or else it will lose its orientation.

DISCLOSURE OF THE INVENTION

It is an object of this invention to provide a slug cutter that can produce about 500 slugs per minute for presentation to a slug clamp without loss of orientation.

Briefly, according to this invention, there is provided an improvement in a device for welding lead wires to slugs. Typically the device comprises a reel for paying out slug feedstock, a die defining an elongated bore into which the slug feedstock is advanced to a cutting position and a device for stepwise pushing the slug feedstock into the die. The device for cutting further comprises a carbide knife pivotally mounted to rotate more or less in a plane perpendicular to the feedstock as it is oriented by the die. Preferably, the cutting plane will be at a small angle to the axis of the feedstock, as will be explained, to promote the smearing of the cut surface by the heel of the knife. The knife has an opening therethrough which may be aligned with the feedstock emerging from the die. One edge of the opening defines a cutting edge. Rocking of the knife effects the shearing of a slug from the feedstock. A welding device comprises a transfer means for receiving and gripping the cut slug as it is pushed through the opening in the knife by the stepwise advancing slug wire. The action of the stepwise advance of the feedstock, the rocking of the knife blade and the transfer means are all synchronized as by being driven from a common camshaft. The elements of the invention described to this point are found in prior art machines. The improvement, according to this invention, comprises the die being of a ferromagnetic material and a permanent pole magnet placed such that one pole abuts the die near the cutting end thereof. Thus magnetic force aligns the slug with the freshly cut end of the feedstock positively positioning the slug for advancement into the transfer means or slug clamp. According to as preferred embodiment, the magnet is an elongate magnet having opposite poles at the most remotely spaced faces thereof. The magnet may be either an Alnicol magnet, ceramic magnet or other magnetic material that does not easily lose its magnetic orientation.

BEST MODE FOR CARRYING OUT THE INVENTION

The continuous welder, of which this invention comprises a portion, has the general function of cutting, clamping a lead wire, cutting and clamping a slug and bringing the clamped lead wire and clamped slug into abutting relationship and passing an electrical current therethrough to cause welding of the wire to the slug. Additionally, the continuous welder may be provided with a picker to remove the welded part to a discharge location. All of these functins must be synchronized. In the past, the synchronization has been achieved by driving all functions from a main camshaft.

Typically the continuous welders have comprised a heavy ribbed casting or the like that sits upon a bench top. The casting has a large vertical face upon which the wire feeding, wire cutting, wire clamping, slug feeding, slug cutting, slug clamping and picker are mounted. On the other side of the casting, the main camshaft is journaled. Openings in the flat face permit linkages from the camshaft to the various apparatus to actuate them in synchronism. Only the slug wire feed, slug cutter, and slug clamp need be discussed for understanding of this invention. Moreover, the slug feeder and slug clamp need only be briefly explained.

Typically the slug wire feedstock is dereeled and threaded through the feeder which stepwise advances the slug feedstock to the cutter. The cutter has a die defining an elongate passage through which the feedstock is pushed. A knife at the end of the die opposite the feed end shears the slug from the feedstock as it is stepwise advanced through the die. The next stepwise advance of the feedstock pushes the slug out of the knife and presents it to the slug clamp which grasps the slug and carries it to the welding position. This invention specifically pertains to the cutter.

Figure 1:
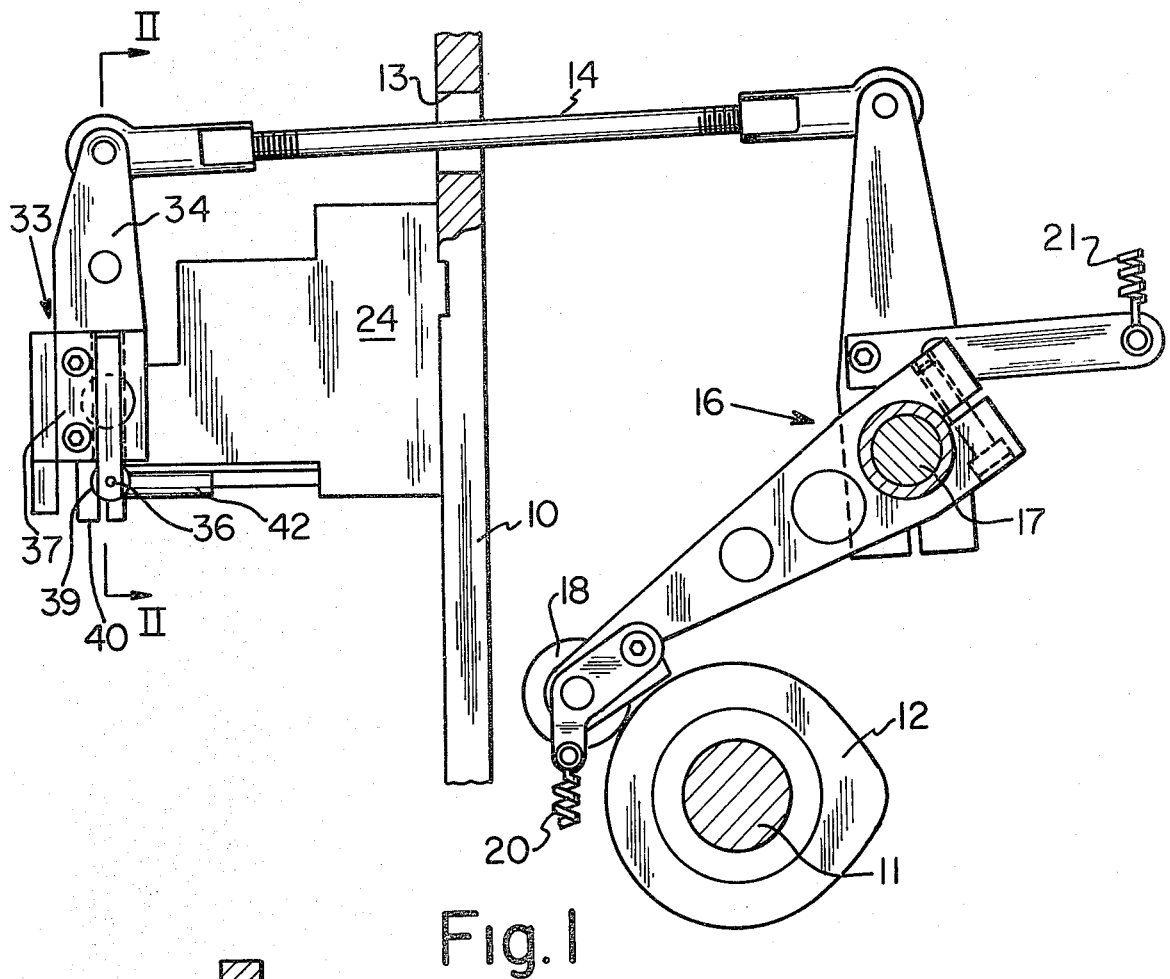
FIG. 1 is a schematic side view of a slug cutting apparatus according to this invention.

Referring now to FIG. 1, the bed plate 10 of the casting supports the cutter. The main camshaft 11 with cam 12 is journaled on the backside of the bed plate (right side as shown in the drawing) and the cutter is positioned on the front side. The main camshaft is journaled in bearings not shown. An opening 13 in the bed plate 10 permits a link 14 to transmit cutting force to the cutter at the appropriate instance in the rotation of the camshaft. The link is driven by the bell crank 16 journaled on rod 17 which is fixed relative to the bed plate. A cam roller 18 bears upon the surface of cam. The cam moves the bell crank to move clockwise (as viewed in FIG. 1) thus moving the link 14 to the right during the instance of cutting. Springs 20 and 21 maintain the cam roller against the cam and thus move the link 14 to the left after the cutting action. A support block structure 24 is secured to the face of the bed plate. The support block structure supports a pivot for the knife support and supports the die.

Figure 2:
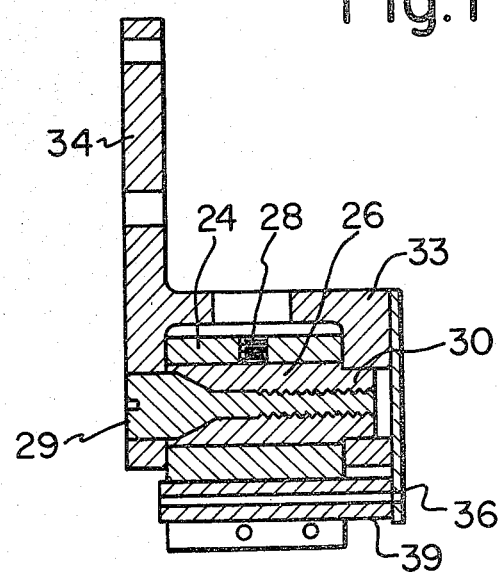
FIG. 2 is a section view through the essential portions of the slug cutting apparatus shown in FIG. 1 taken along lines II—II in FIG. 1.

Referring to FIG 2, the support block 24 has a bore with an axis parallel to the face of the bed plate and bench top (horizon). A bushing 26 slides into the bore. The bushing has conical inner surfaces of each end as shown. A set screw is positioned in a threaded bore 28 to pin the bushing 26 in one axial position. A pivot bolt 29 has a conical exterior surface between head and shank for abutting one of the conical surfaces of the bushing. The shank is threaded and extends through the bushing. A pivot nut 30 has internal threads and has a conical exterior surface for abutting one of the conical surfaces of the bushing 26. when the pivot bolt 29 and pivot nut 30 are turned together into the bushing 26, they define smooth cylindrical axle surfaces extending from the support block 24. Journaled on the axle surfaces defined by the pivot nut and bolt is a knife support 33. The knife support has an upwardly extending arm 34 which is secured to the link 14. Reciprocation of the link 14 causes rocking of the knife support 33. A carbide blade 36 is releasably secured to one face of the knife support. The knife is held in place by knife clamp 37 bolted to the knife support 33.

Feedstock guide or die 39 has a central bore through which the feedstock is advanced to the shearing position. The die is held to support block 24 by clamp 40 bolted to the support block. The knife blade 36 has an opening therein which aligns with the bore in the die 39. The opening has one edge that comprises a cutting edge for engaging and shearing the feedstock extending out of the die into the opening of the knife blade when the knife support is rocked. The blade is canted relative to the axis of the die bore at an angle of about two degrees to drag the heel of the knife across the cut face of the feedstock. Thus when the feedstock is copper coated iron (Dumet), copper is smeared over the cut surface of the stock still held by the die.

As can be appreciated, when the shearing is completed the cut slug rests in the hole in the knife blade free to fall out of position. In lower speed machines the slug has been kept in place by a blast of air directed at the knife. Even so, since the hole in the knife is not necessarily round, the position of the slug within the hole is indeterminate. According to this invention, a magnet 42 is placed with one pole adjacent the die near the cutting end of the die. The magnet in a matter not totally understood, holds the slug within the knife hole and when the knife rocks back into its position with the hole in the knife aligned with the bore of the die, the slug is drawn into abutting relation with the exposed end of the feedstock in the die. At this instance, the feedstock is stepwise advanced pushing the slug out of the knife. The slug is positively positioned by the magnetic forces on the end of the feedstock.

Figure 3:
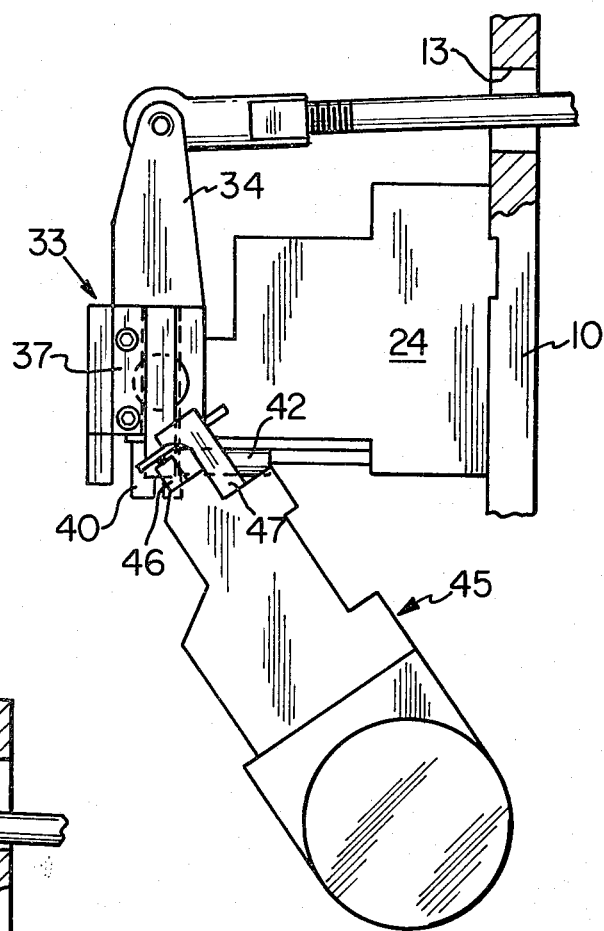
FIG. 3 is a schematic side view of a slug cutter and slug clamp at the instance of transfer of the slug to the clamp.
Figure 4:
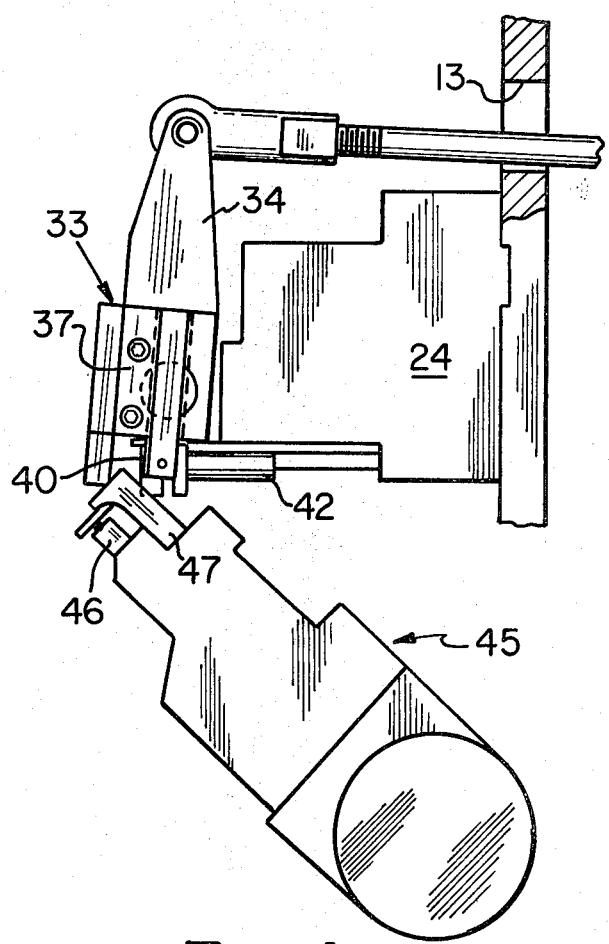
FIG. 4 is a schematic view similar to FIG. 3 at the time of slug cutting and welding.

Referring to FIGS. 3 and 4, the slug clamp 45 is shown. The slug clamp is a pivoted arm that rocks between the two angular positions as shown in FIGS. 3 and 4, respectively. A first finger 46 has a V-groove in the end thereof. A second finger 47 moves toward and away from the V-groove as the slug clamp is rocked back and forth. As shown in FIG. 3, a slug clamp 45 is positioned to receive the slug as it is pushed out of the knife. As shown in FIG. 4, the slug clamp then carries the slug to the welding position while the next slug is being cut.

The magnetic properties of the parts of the slug cutter are deemed important. All of the metal parts are ferromagnetic steel including the die. The carbide knife is also ferromagnetic as is the feedstock being advanced through the die. Considering the numerous low reluctance pathways for the magnetic flux lines emerging from one pole to reach the other pole of the magnet it is surprising that the magnet is so effective in pulling the slug into alignment with the feedstock. Nevertheless, the magnetic field does so. The magnetic alignment of the slug has been effective in welders cutting as high as 750 slugs per minute whereas without the magnetic slug positioning the transfer of the slugs to the slug clamp became unreliable at speeds over 200 slugs per minute.

Having thus described the invention with the detail and particularly required by the Patent Laws, what is desired protected by Letters Patent is set forth in the following claims.

I claim:

1. In a device for cutting slugs from ferromagnetic feedstock, a die defining an elongate bore into which the feedstock is passed, a knife pivotally mounted to rotate in a plane substantially perpendicular to the feedstock as it is oriented by the die, said knife defining an opening therethrough into which the feedstock is passed when the bore in the die and opening in the knife are aligned, said opening in the knife having an edge adjacent the die defining a cutting edge, means for rocking the knife to shear a slug from the feedstock, transfer means for receiving and clamping the cut slug as it is advanced through the opening in the knife, the improvement comprising said die being of a ferromagnetic material and there being a small permanent magnet positioned with one magnetic pole abutting the die near the cutting end thereof whereby the slug when cut free moves to align itself end to end with the feedstock emerging from the die without losing its orientation.

* * * * *